(12) United States Patent
Aoki et al.

(10) Patent No.: US 8,426,005 B2
(45) Date of Patent: Apr. 23, 2013

(54) OPTICAL INFORMATION RECORDING MEDIUM

(75) Inventors: Kazuhiko Aoki, Tokyo (JP); Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 51 days.

(21) Appl. No.: 13/256,136

(22) PCT Filed: Mar. 12, 2010

(86) PCT No.: PCT/JP2010/054192
§ 371 (c)(1),
(2), (4) Date: Sep. 12, 2011

(87) PCT Pub. No.: WO2010/106972
PCT Pub. Date: Sep. 23, 2010

(65) Prior Publication Data
US 2012/0017230 A1    Jan. 19, 2012

(30) Foreign Application Priority Data
Mar. 18, 2009   (JP) .................................. 2009-066078

(51) Int. Cl.
*B32B 3/02* (2006.01)
(52) U.S. Cl.
USPC ................ 428/64.1; 428/64.4; 430/270.12
(58) Field of Classification Search ............... 428/64.4; 430/270.12
See application file for complete search history.

(56) References Cited

U.S. PATENT DOCUMENTS

| | | | |
|---|---|---|---|
| 6,835,531 B1 | 12/2004 | Yoon et al. | |
| 6,961,300 B2 * | 11/2005 | Cheong et al. | 369/275.1 |
| 7,940,637 B2 * | 5/2011 | Hwang et al. | 369/275.4 |
| 2006/0046013 A1 * | 3/2006 | Bae et al. | 428/64.4 |
| 2009/0269542 A1 | 10/2009 | Shima et al. | |

FOREIGN PATENT DOCUMENTS

| | | |
|---|---|---|
| JP | 5-258345 | 10/1993 |
| JP | 7-235079 | 9/1995 |
| JP | 08-147757 | 6/1996 |
| JP | 9-128807 | 5/1997 |
| JP | 2001-052376 | 2/2001 |
| JP | 2003-195374 | 7/2003 |
| JP | 2008-511096 | 4/2008 |
| WO | WO 2008/035522 | 3/2008 |
| WO | WO 2008/142964 | 11/2008 |

OTHER PUBLICATIONS

International Search Report, PCT/JP2010/054192, Apr. 20, 2010.

* cited by examiner

*Primary Examiner* — Elizabeth Mulvaney
(74) *Attorney, Agent, or Firm* — Young & Thompson

(57) ABSTRACT

A super-resolution optical information recording medium comprises a super-resolution layer and a recording layer which are laminated on a support substrate, wherein the super-resolution layer is provided with properties consisting of a first state to maintain a solid phase against irradiation of a laser beams, and a second state to become a liquid layer state against irradiation of a laser beam onto a recording mark on the recording layer to thereby change an optical constant. The optical constant is determined so that a ratio of a super-resolution signal intensity obtained at a second state region against a background light interference intensity obtained at a first state region is at least 1.8, and a ratio of the super-resolution signal intensity obtained at the second state region against a disk noise intensity obtained at first and second state regions is at least 0.16.

4 Claims, 12 Drawing Sheets

FIG.9

| FILM THICKNESS OF FIRST DIELECTRIC FILM 22 (nm) | FILM THICKNESS OF SECOND DIELECTRIC FILM 23 (nm) | FILM THICKNESS OF THIRD DIELECTRIC FILM 24 (nm) | REFLECTANCE R1 (%) | REFLECTANCE R2 (%) | REFLECTANCE R3 (%) | REFLECTANCE R4 (%) | DESIGN INDEX f1 | DESIGN INDEX f2 | BER |
|---|---|---|---|---|---|---|---|---|---|
| 30 | 55 | 10 | 2.0 | 6.8 | 14.7 | 27.1 | 2.6 | 0.25 | 3x10^-7 |
| 25 | 50 | 10 | 3.7 | 10.6 | 14.8 | 28.4 | 2.0 | 0.24 | 7x10^-7 |
| 20 | 55 | 15 | 2.1 | 4.8 | 15.4 | 25.8 | 3.9 | 0.22 | 6x10^-6 |
| 45 | 55 | 20 | 2.9 | 6.7 | 20.5 | 32.9 | 3.3 | 0.20 | 2x10^-5 |
| 40 | 55 | 10 | 4.2 | 10.0 | 19.8 | 31.1 | 1.9 | 0.17 | 4x10^-5 |
| 40 | 50 | 15 | 3.4 | 9.6 | 19.7 | 30.4 | 1.7 | 0.17 | 4x10^-4 |
| 50 | 65 | 10 | 5.7 | 10.2 | 25.6 | 36.4 | 2.4 | 0.14 | 6x10^-4 |
| 40 | 50 | 10 | 3.7 | 14.0 | 17.1 | 33.0 | 1.5 | 0.24 | 3x10^-3 |
| 50 | 55 | 10 | 5.8 | 19.0 | 22.9 | 41.8 | 1.4 | 0.21 | 2x10^-2 |
| 45 | 50 | 10 | 7.0 | 16.0 | 22.5 | 34.3 | 1.3 | 0.15 | 3x10^-2 |

DISK ROTATING
DIRECTION

OPTICAL INFORMATION RECORDING MEDIUM

TECHNICAL FIELD

The present invention relates to an optical information recording medium and the like which reproduce information by using light beams. More specifically, the present invention relates to an optical information recording medium that is preferable for reproducing information recorded with high density.

BACKGROUND ART

As an example of an optical information recording medium which reproduces information by using laser beams, there is an optical disk. An optical disk is characterized to have a large capacity, and it is used widely as a medium for circulating and keeping images, music, or information on computers. Optical disks can be classified into "read only memory (ROM) type" which only reproduces information recorded in advance, "write-once read-many type" to which information can be written only once, and "rewritable type" to which information can be rewritten as many times as desired.

The capacity of the optical disk is determined according to the size of recording marks. The smaller the mark is, the more the capacity can be increased. The size of the recording mark basically depends on a condensed light spot size of a laser beam used for reproducing information. That is, with a smaller spot size, information of still higher density can be reproduced with a finer reproduction quality.

The spot formed by condensing laser beams by an objective lens does not converge into one point even at the condensed point and has a limited size due to a diffraction effect of light. This is generally called a diffraction limit, and it is a limit of mark length reproduced by $\lambda/(4NA)$ where the wavelength of the laser beam is $\lambda$ and the numerical aperture of the objective lens is NA.

For example, with an optical system where $\lambda=405$ nm and NA=0.85, 119 nm is the reproduction limit of the mark length, and a mark with length shorter than that cannot be read out precisely. In order to increase the capacity of the optical disk, there is a method of shortening the wavelength of the laser beam or a method of increasing NA of the objective lens. However, there is a limit in shortening the wavelength of the laser beam and increasing NA of the objective lens in terms of manufacture of optical components.

In the meantime, as a technique for improving the reproduction resolution by going over the diffraction limit, there is known a medium super-resolution technique. In the medium super-resolution, used is a medium which utilizes a super-resolution film whose optical characteristic changes nonlinearly by temperatures or light intensities. Here, a case of using a super-resolution film whose reflectance drastically changes at a given temperature as depicted in Patent Document 1 will be described by referring to FIG. 11. In this case, a phase change material is used as the super-resolution film, and a difference between the reflectance in a crystal state (solid phase) and the reflectance in a state where it is fused at a melting point or higher (liquid state) is utilized.

FIG. 12 is a conceptual chart showing a fragmentary enlarged view of a single track recording mark sequence out of recording marks formed in advance along a spiral track on a transparent substrate of a super-resolution optical disk according to a widely-used technique. A laser beam passed through an objective lens is irradiated on a medium as a condensed light spot 200. The temperature in the vicinity of the condensed light spot 200 is increased due to absorption of the irradiated laser beam, so that a high-temperature region is generated. The light intensity distribution in the condensed light spot 200 is Gaussian distribution where the intensity in the center is strong. Thus, regarding the temperature distribution that depends on the light intensity, the temperature in the vicinity of the center becomes the highest.

In a fused region 201 that is a region particularly exceeding the melting point of the super-resolution film among the high-temperature region, the reflectance is increased since the super-resolution film changes from a solid phase state to a liquid phase state. Thus, it can function as an aperture for reproducing the recording mark. As a result, the size of the aperture contributing to reproduction can be made smaller than the condensed light spot size that is determined according to the diffraction limit Therefore, information of a small recording mark 203 that is equal to or smaller than the reproduction limit can be read out as a super-resolution reproduction signal.

As in this case, a super-resolution reproduction method with which apertures are formed in the rear side of the traveling direction of the condensed light spot is called RAD (Rear Aperture Detection) type super-resolution. Since the optical disk is rotating at a high speed, the fused region 201 moves on the optical disk. Thus, the time for a given region to be fused is extremely short.

With the RAD type super-resolution of a ROM disk, an ideal super-resolution reproduction can be done only by using apertures when reflectance Ru of the aperture (fused region 201) is sufficiently higher than reflectance Rd of regions (non-fused region 202) other than apertures. However, practically, the reflectance in the regions other than the apertures cannot be made so small that it can be ignored. Thus, in Patent Document 1, the bit error rate is set to be equal to or less than "10^-5" by setting the ratio of the two kinds of reflectance as Ru/Rd≧8. In this Specification, "10 to the power of minus five" is expressed in a form of "10^-5".

Further, as other technical documents related to this, Patent Document 2 discloses an optical recording medium which utilizes a non-linear optical thin film whose refractive index changes reversibly according to changes in the intensity of irradiated laser beams. Patent Document 3 discloses an optical recording medium in which a light adjusting film is provided between a transparent substrate and a recording film so as not to generate a phase difference between a recorded section and unrecorded section. Patent Document 4 discloses an optical recording medium in which deterioration in the performance for repeated reproduction is suppressed by setting the melting point of a super-resolution layer to be lower than that of a recording layer.

Patent Document 1: Japanese Unexamined Patent Publication Hei 09-128807
Patent Document 2: Japanese Unexamined Patent Publication 2003-195374
Patent Document 3: Japanese Unexamined Patent Publication Hei 08-147757
Patent Document 4: Japanese Patent Application Publication 2008-511096

DISCLOSURE OF THE INVENTION

Problems to be Solved by the Invention

In a case of the ROM disk as in Patent Document 1, a phase pit is used as a recording mark, and the recording mark is detected according to a phase difference of light reflected by the uneven pattern thereof. Thus, it only needs to consider two kinds of reflectance, i.e., the reflectance of the aperture and the reflectance of the region other than the aperture. However, the cases of write-once and read-many disk and rewritable disk are under a more complicated condition, i.e., four kinds of reflectance in total such as the recording mark within an aperture and space as well as the region other than the aperture and space need to be considered simultaneously, so that it is not possible with the technique of Patent Document 1 to achieve the write-once and read-many disks and rewritable disks.

The techniques of Patent Documents 2, 3, and 4 can be applied to the write-once and read-many disks and rewritable disks. However, it is extremely difficult to consider the four kinds of reflectance and to set appropriate values with those techniques. Therefore, with those techniques, there is such a substantial issue that it is difficult to achieve write-once and read-many disks and rewritable disks which perform stable super-resolution reproduction and recording with a fine bit error rate.

An object of the present invention is to improve the inconveniences of the related techniques, and to provide a super-resolution optical information recording medium which can perform super-resolution reproduction and recording stably and effectively with a fine bit error rate of a small recording bit that is equal to or smaller than the reproduction limit in particular.

Means for Solving the Problems

In order to achieve the foregoing object, the super-resolution optical information recording medium is characterized as a super-resolution optical information recording medium including a super-resolution layer and a recording layer stacked on a support substrate, with which reproduction of information is executed by using a light beam, wherein: the super-resolution layer has, as characteristics thereof, a first state which keeps a solid phase state for irradiation of the light beam and a second state with which an optical constant changes by being turned into a liquid layer state for irradiation of a light beam whose light intensity is higher than the light beam of the first state; optical constant in an unrecorded region of the recording layer under a state where the super-resolution layer is in the first state is defined as R1 and optical constant of a region where data is recorded is defined as R2, whereas optical constant in an unrecorded region of the recording layer under a state where the super-resolution layer is in the second state is defined as R3 and optical constant of a region where data is recorded is defined as R4; and each optical constant in the recorded region and the unrecorded region of the recording layer is so specified that a ratio of a super-resolution signal intensity acquired in the second state region with respect to a background light interference intensity acquired in the first state region for the light beam is expressed as $f1=|(R4-R3)/(R2-R1)|$ and specified to satisfy $f1 \geq 1.8$, and that a ratio of a super-resolution signal intensity acquired in the second state region with respect to a disk noise intensity acquired in the regions of each of the first state and the second state is expressed as $f2=|(R4-R3)/(R1+R2+R3+R4)|$ and specified to satisfy $f2 \geq 0.16$.

Effect of the Invention

For the beam used at the time of recording and reproduction, the present invention is structured to specify the reflectance in each of the regions such as the recorded region and unrecorded region of the recording layer so that the ratio of the super-resolution signal intensity acquired in the second state (liquid phase state) with respect to the interference intensity of the background light from the region other than the aperture acquired in the first state (solid phase state) region becomes 1.8 or larger and the ratio of the super-resolution signal intensity acquired in the second region with respect to the disk noise intensity acquired in the first and second regions becomes 0.16 or larger. Thus, it becomes possible to acquire the signal of intensity that is sufficiently larger than the interference of the background light and the disk noise from the second state region that is smaller than the condensed light spot by simply specifying the reflectance. Thereby, it becomes possible to perform super-resolution reproduction and recording of a small recording bit that is equal to or smaller than the reproduction limit in particular stably and effectively with a fine bit error rate.

BRIEF DESCRIPTION OF THE DRAWINGS

FIG. 9 is a table showing medium structure (thickness of each dielectric film), reflectance R1 to R4, design indexes f1, f2, and bit error rates of super-resolution reproduction signal regarding ten typical types of media out of seventy-six types of media;

BEST MODES FOR CARRYING OUT THE INVENTION

Hereinafter, a first exemplary embodiment of the invention will be described by referring to the accompanying drawings.

First, basic contents of the present invention will be described, and specific contents will be described thereafter.

Figure 1:
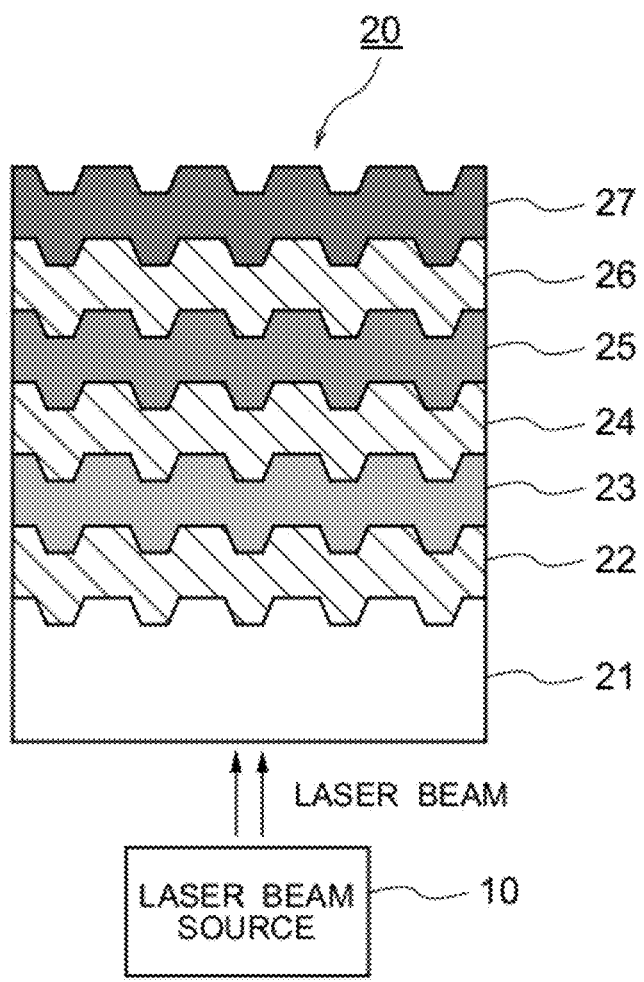
FIG. 1 is a conceptual diagram showing a first exemplary embodiment of an optical information recording medium according to the present invention.

An optical information recording medium 20 according to the exemplary embodiment is structured to include a super-resolution film 23 as a super-resolution layer and a recording layer 25 as a recoding layer stacked on a transparent substrate 21 as a support substrate as shown in FIG. 1, and structured to perform reproduction of information by using a light beam.

Out of those, as the characteristics thereof, the super-resolution layer 23 has a first state which keeps a solid phase state for irradiation of the beam and a second state with which the reflectance changes by being turned into the liquid layer state for irradiation of the light beam with the higher light intensity than the light beam of the first state.

First, it is so defined that the reflectance in the unrecorded region of the recording film 25 under a state where the super-resolution film 23 is in the first state is R1 and the reflectance in the region where data is recorded is R2, whereas it is so defined that the reflectance in the unrecorded region of the recording film 25 under a state where the super-resolution layer 23 is in the second state is R3 and the reflectance in the region where data is recorded is R4, respectively. Further, for the irradiation of the beam, each reflectance in the recorded region and the unrecorded region of the recording layer is so specified that the ratio of the super-resolution signal intensity acquired in the second state region with respect to the background light interference intensity acquired in the first state region is expressed as $f1=|(R4-R3)/(R2-R1)|$ and specified to satisfy $f1 \geqq 1.8$, and that the ratio of the super-resolution signal intensity acquired in the second state region with respect to the disk noise intensity acquired in the regions of each of the first state and the second state is expressed as $f2=|(R4-R3)/(R1+R2+R3+R4)|$ and specified to satisfy $f2 \geqq 0.16$.

The transparent substrate 21 as the support substrate described above is naturally transparent. Further, the super-resolution film 23 and the recording layer 25 are both formed on the support substrate 21 along with a reflection film 27 via dielectric films 22, 24, and 26. The light beam is a laser beam.

Figure 10:
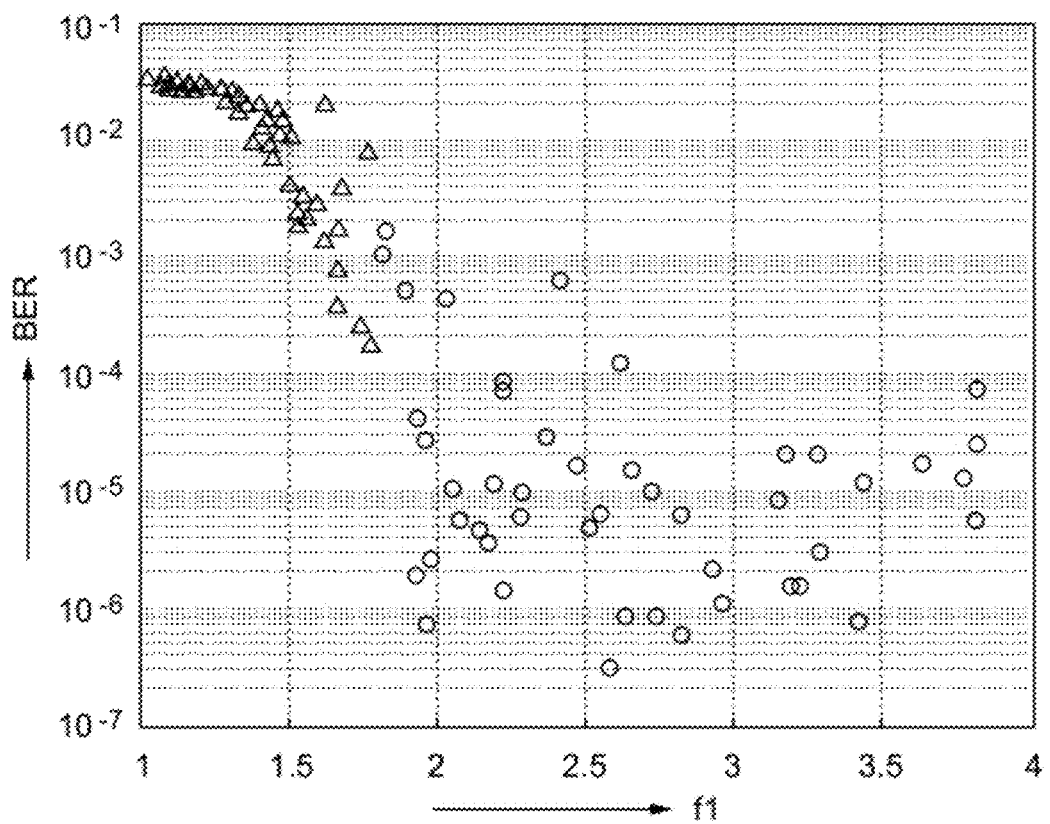
FIG. 10 is a graph showing the relation between the design index f1 and BER of the super-resolution reproduction signal of the optical information recording medium shown in FIG. 1 and FIG. 2.
Figure 11:
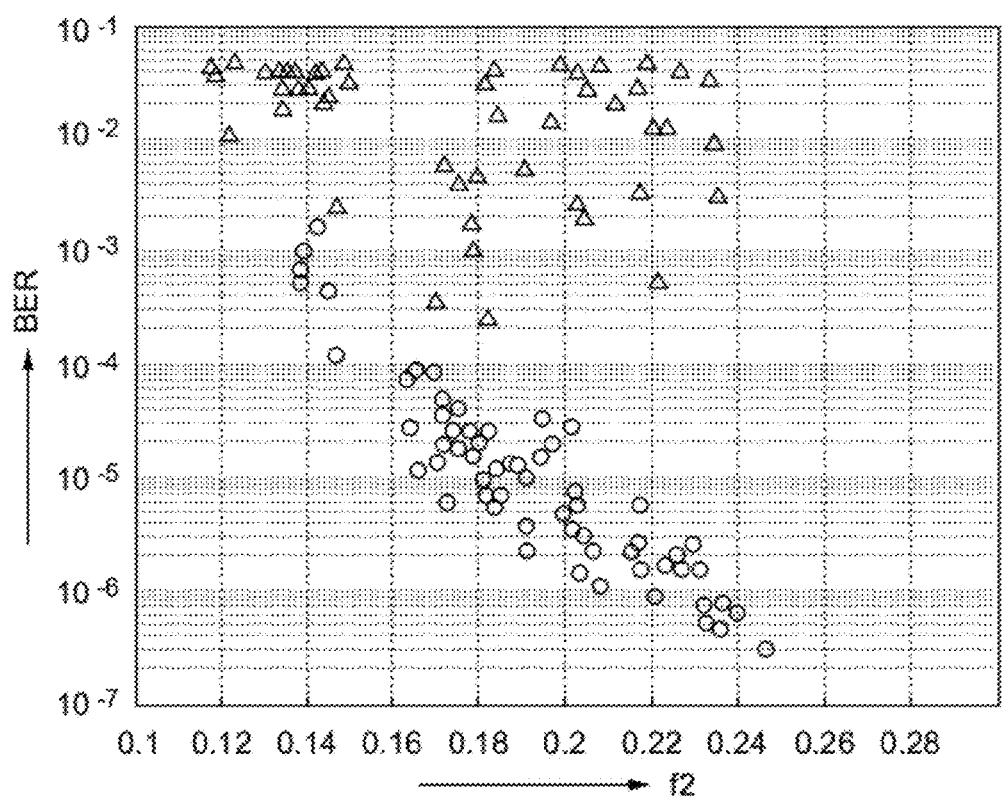
FIG. 11 is a graph showing the relation between the design index f2 and BER of the super-resolution reproduction signal of the optical information recording medium shown in FIG. 1 and FIG. 2.
Figure 12:
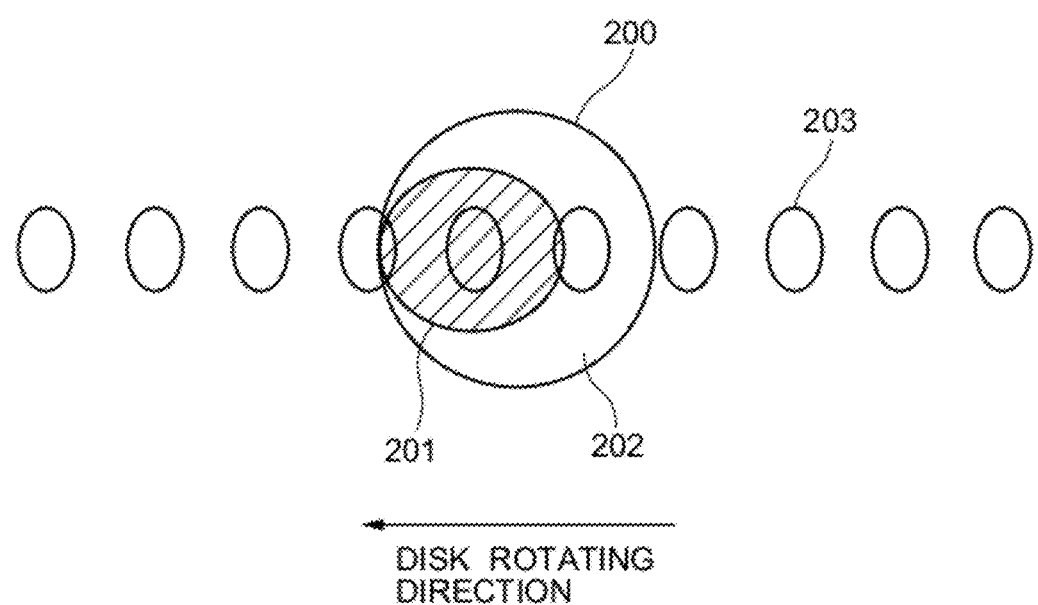
FIG. 12 is a conceptual chart showing a fragmentary enlarged view of a single track recording mark sequence out of recording marks formed in advance along a spiral track on a transparent substrate of a super-resolution optical disk according to a widely-used technique.

With this, as is evident from FIG. 10 and FIG. 11, it is possible to acquire an optical information recording medium which can perform super-resolution reproduction and recording of a small recording bit that is equal to or smaller than the reproduction limit in particular stably and effectively with a fine bit error rate.

Hereinafter, it will be described in more detail.

FIG. 1 is a conceptual diagram showing the first exemplary embodiment of the optical information recording medium according to the present invention. In the optical information recording medium 20 shown in FIG. 1, the super-resolution film 23 is provided via the first dielectric film 22 on the transparent substrate 21 of the disk where a track is formed in advance, the recording film 25 is provided thereon via the second dielectric film 24, and the reflection film 27 is provided via the third dielectric film 26. A laser beam source 10 is provided on the transparent substrate 21 side of the optical information recording medium 20, and a laser beam is irradiated to the optical information recording medium 20.

The super-resolution film 23 is a thin film whose complex refractive index drastically and reversibly changes at a prescribed temperature. As a drastic and reversible change of the complex refractive index, there are a change from a solid phase to a liquid phase due to fusion of a phase change material and a change from a liquid phase to a solid phase due to solidification of a phase change material, for example. When the super-resolution film 23 turns into a liquid layer, the reflectance in the super-resolution film 23 increases drastically due to the change in the complex refractive index. Further, the recording film 25 is a thin film whose complex refractive index changes at a prescribed temperature. As a change of the complex refractive index, there is an oxidation reaction of a metal oxide film, for example.

Figure 2:
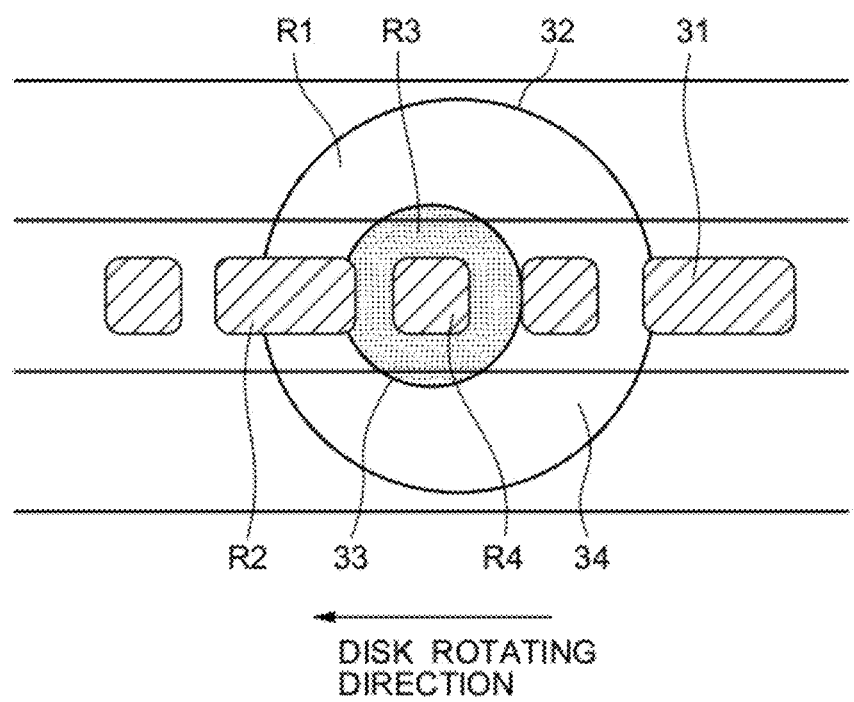
FIG. 2 is a conceptual diagram showing a fragmentary enlarged view of three track recording marks out of recording marks formed along a spiral track of the optical information recording medium shown in FIG. 1.

FIG. 2 is a conceptual diagram showing a fragmentary enlarged view of three track recording marks 31 out of recording marks 31 formed along a spiral track of the optical information recording medium 20 shown in FIG. 1. The laser beam is irradiated as a condensed light spot 32, and a fused region where the temperature exceeds the melting point of the super-resolution film due to an increase in the temperature becomes an aperture 33. The reflectance of a space in a region 34 other than the aperture out of the condensed light spot is expressed as R1, the reflectance of the recording mark as R2, the reflectance in a space within the aperture as R3, and the reflectance of the recording mark as R4.

The reproduction performance of the optical information recording medium 20 is determined according to four kinds of reflectance R1 to R4, and the four kinds of reflectance are determined according to composition of each of the first dielectric film 22 to the reflection film 27 and the design of the film thickness provided to the optical information recording medium 20. However, there has been no clear design guide for satisfying a prescribed reproduction performance, so that designing has been done by repeating trials and errors. Further, there are a great number of parameters of the reflectance, so that it is difficult to acquire a clear design guide.

For that, the inventors have come to find out that the design index can be summarized into two relational expressions as a result of conducting designing and experiments for many times. That is, when the optical information recording medium 20 satisfying $f1 \geqq 1.8$ and $f2 \geqq 0.16$ under a condition where two design indexes such as f1 and f2 are defined as $f1 \equiv |(R4-R3)/(R2-R1)|$, $f2 \equiv |(R4-R3)/(R1+R2+R3+R4)|$, it is found that a bit error rate of $10^{-4}$ or less that is the index for the optical information recording medium 20 to bear the practical use can be acquired. Note that f1 is a design index corresponding to the ratio of the intensity of the super-resolution signal and the intensity of the background light interference, while f2 is a design index corresponding to the ratio of the intensity of the super-resolution signal and the intensity of the disk noise.

The four kinds of reflectance R1 to R4 can be measured in a following manner. The reflectance R1 of the space in the region other than the aperture can be acquired as $R1=P1/PL$ from a reflected light detection power P1 that is detected by irradiating a laser beam of a low power PL with which fusion of the super-resolution film does not occur to the region of the optical information recording medium 20 where the track is not formed.

Regarding the reflectance R2 of the recording mark in the region other than the aperture, reflectance $R2p=P2/PL$ can be acquired by first recording a mark whose mark length is sufficiently longer than the condensed light spot in the center of the track of the optical information recording medium 20 and then detecting a reflected light detection power P2 that is detected when irradiating a laser beam of a low power PL with which fusion of the super-resolution film does not occur.

When the reflectance R2p is plotted by changing the recording power, there is a point of reflection generated due to a phase difference of the track at a point where the mark width and the track width become the same. The reflectance of the point of reflection is defined as R2t. Provided that R1 is already known, the relation between R2 and R2t can be acquired in advance from the relation between the track width and the condensed light spot diameter. Thus, R2 can be acquired from R2t by using that relation. Specific way of acquiring R2 will be described in EXAMPLE 1 later.

Regarding the reflectance R3 of the space within the aperture, reflectance R3p=P3/PH can be acquired from a reflected light detection power P3 that is detected at the time of irradiating a laser beam of a high power PH with which fusion of the super-resolution film occurs on the track of the optical information recoding medium 20 where the mark is not recorded. When the reflectance R3p is plotted by changing the recording power, there is a point of reflection generated due to a phase difference of the track at a point where the aperture width and the track width become the same. The reflectance of the point of reflection is defined as R3t. Provided that R1 is already known, the relation between R3 and R3t can be acquired in advance from the relation between the track width and the condensed light spot diameter. Thus, R3 can be acquired from R3t by using that relation. Specific way of acquiring R3 will be described in EXAMPLE 1 later.

Regarding the reflectance R4 of the recording mark within the aperture, reflectance R4p=P4/PH is acquired from a reflected light detection power P4 that is detected at the time of irradiating a laser beam of a high power PH with which fusion of the super-resolution film occurs on the track of the optical information recoding medium 20 where the recording mark in the same width as the track width used when acquiring the reflectance R2 is recorded.

When the reflectance R4p is plotted by changing the recording power, there is a point of reflection generated due to a phase difference of the track at a point where the aperture width and the track width become the same. The reflectance of the point of reflection is defined as R4t. Provided that R1 and R2 are already known, the relation between R4 and R4t can be acquired in advance from the relation between the track width and the condensed light spot diameter. Thus, R4 can be acquired from R4t by using that relation. Specific way of acquiring R4 will be described in EXAMPLE 1 later.

EXAMPLE 1

Next, a specific example of the optical information recording medium 20 will be described. The first to third dielectric films, recording film, and super-resolution layer shown in FIG. 1 were added to the polycarbonate transparent substrate 21 of 0.6 mm in thickness on which a track with a track pitch of 400 nm is formed, and an evaluation was conducted by using an optical system (reproduction limit pit length of 156 nm) of λ=405 nm and NA=0.65. The groove depth of the track was set as 25 nm, and the ratio of land:groove (the width of the band where the data is recorded and the width in the middle thereof) was set as 1:1.

The optical information recording medium 20 was acquired by forming a track on the polycarbonate transparent substrate 21 through stamper-transcribing a track master plate, and forming the first dielectric film 22 made of ZnS—SiO$_2$, the super-resolution film 23 (film thickness of 15 nm) made of InSb, the second dielectric film 24 made of ZnS—SiO$_2$, the recording film 25 (film thickness of 15 nm) made of Co$_3$O$_4$, the third dielectric film 26 made of ZnS—SiO$_2$, and the reflection film 27 (film thickness of 50 nm) made of Ag alloy on the transparent substrate 21 in this order from the bottom side by sputtering.

Regarding the film thickness of the first to third dielectric films, the first dielectric film 22 is changed between 20 and 25 nm, the second dielectric film 24 is changed between 50 and 70 nm, and the third dielectric film 26 is changed between 10 to 40 nm by a 5-nm interval to prepare seventy-six kinds of media whose reflectance R1 is 2% or more. At first, the reflectance R2 to R4 of those media was measured.

The method for measuring the reflectance R1 to R4 will be described by referring to a case of a medium (medium A) whose first dielectric film 22 is 25 nm, second dielectric film 24 is 50 nm, and third dielectric film 26 is 10 nm. First, the reflectance R1 of a space in a region other than an aperture was acquired. A laser beam of a low power PL=0.3 mW with which fusion of the super-resolution film does not occur was irradiated to the region of the medium A where no track is formed, and a reflected light detection power P1=0.011 mW was acquired. R1=P1/PL=0.11/0.3=0.037, i.e., 3.7%, was acquired from the reflected light detection power P1=0.011 mW.

Figure 3:
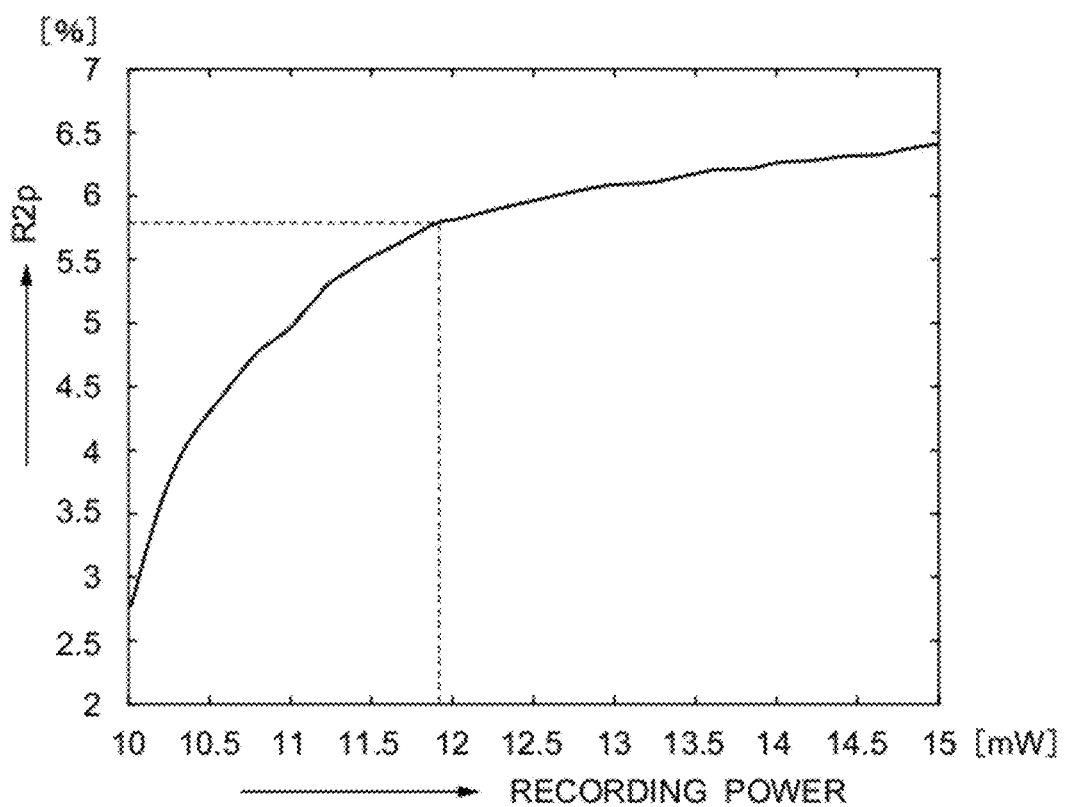
FIG. 3 is a graph acquired by measuring reflectance R2$p$ while changing the recording power between 10 and 15 mW with the optical information recording medium shown in FIG. 1 and FIG. 2.

Next, the reflectance R2 of a recording mark in the region other than the aperture is acquired. First, a mark whose mark length was sufficiently longer than the condensed light spot was recorded in the center of the track of the recording medium A, and the reflectance R2p=P2/PL was acquired from a reflected light detection power P2 at the time of irradiating a laser beam of a low power PL=0.3 mW with which fusion of the super-resolution film 23 does not occur. FIG. 3 is a graph acquired by measuring the reflectance R2p while changing the recording power between 10 and 15 mW with the optical information recording medium 20 shown in FIG. 1 and FIG. 2.

Figure 4:
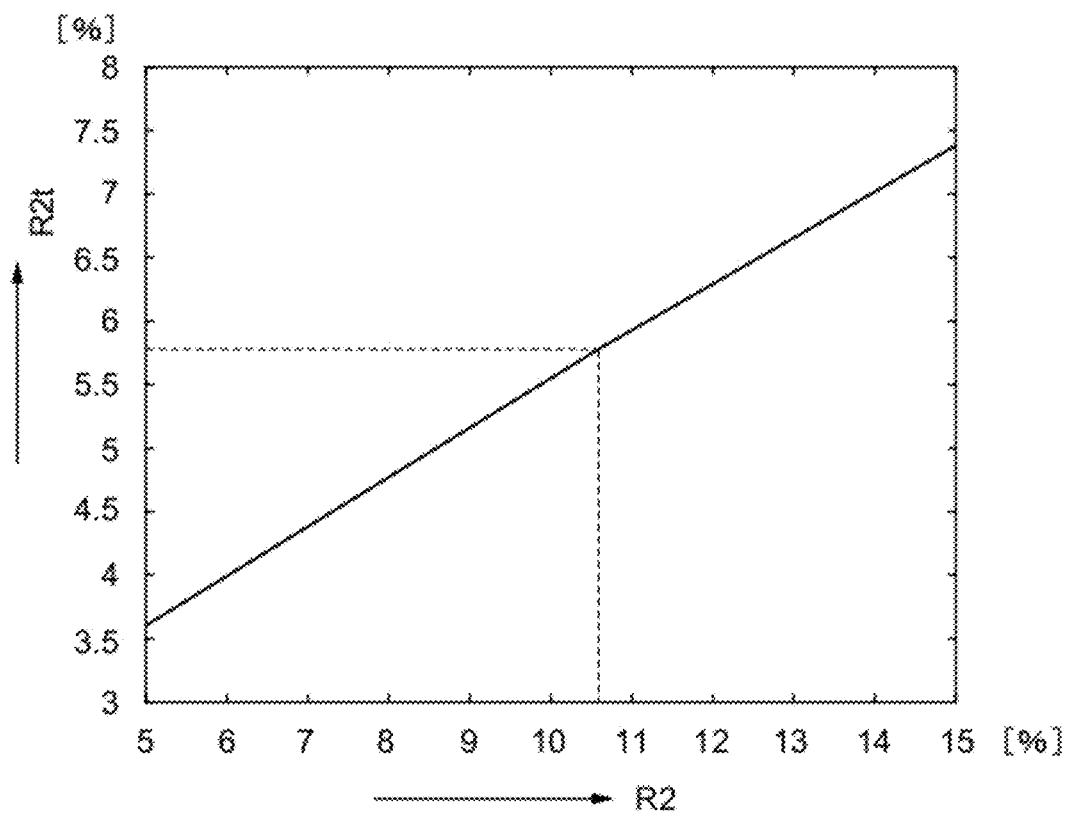
FIG. 4 is a graph showing the relation between R2 and R2$t$ acquired from the relation of reflectance R1, track width, and condensed light spot diameter with the optical information recording medium shown in FIG. 1 and FIG. 2.

According to FIG. 3, there is a point of reflection generated in the reflectance R2p at the recording power of 11.8 mW. This is a point of reflection generated due to a phase difference of the track when the mark width becomes the same as the track width. From FIG. 3, the reflectance at the point of reflection was acquired as R2t=5.8%. FIG. 4 is a graph showing the relation between R2 and R2t acquired from the relations regarding the reflectance R1, the track width, and the condensed light spot diameter in the optical information recording medium 20 shown in FIG. 1 and FIG. 2. From that, it was acquired as R2=10.6%.

Figure 5:
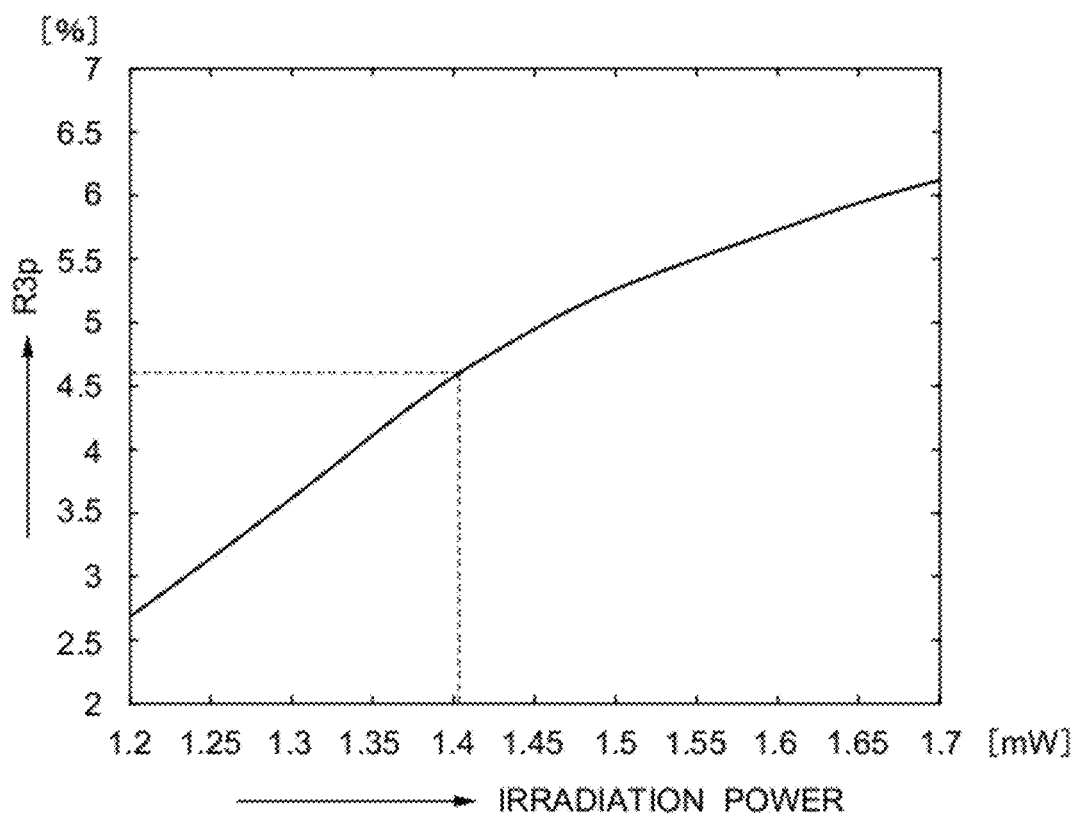
FIG. 5 is a graph acquired by measuring reflectance R3$p$ while changing the irradiation power between 1.2 and 1.7 mW with the optical information recording medium shown in FIG. 1 and FIG. 2.

Subsequently, the reflectance R3 of the space within the aperture is acquired. The reflectance R3p=P3/PH was acquired from the reflected light detection power P3 at the time of irradiating a laser beam of a high power PH with which the super-resolution film is fused on the track of the medium A where the mark is not recorded. FIG. 5 is a graph acquired by measuring the reflectance R3p while changing the irradiation power between 1.2 and 1.7 mW with the optical information recording medium 20 shown in FIG. 1 and FIG. 2.

Figure 6:
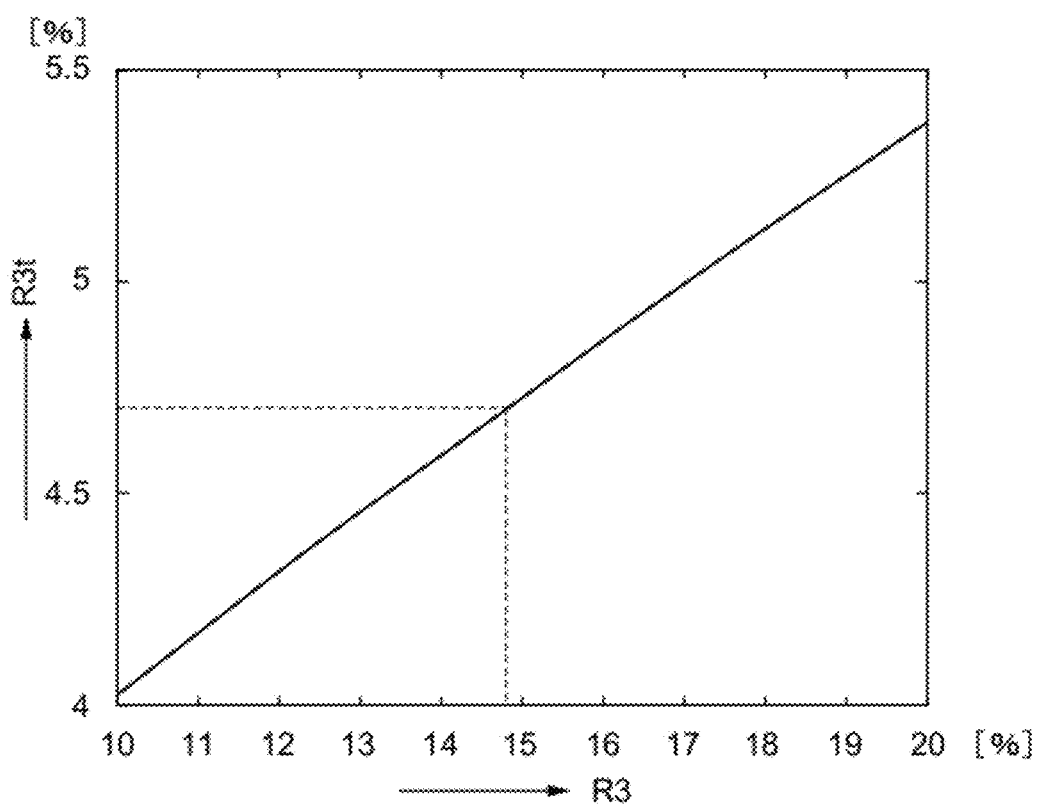
FIG. 6 is a graph showing the relation between R3 and R3$t$ acquired from the relation of reflectance R1, track width, and condensed light spot diameter with the optical information recording medium shown in FIG. 1 and FIG. 2.

According to FIG. 5, there is a point of reflection generated in the reflectance R3p in the vicinity of the irradiation power of 1.4 mW. This is a point of reflection generated due to a phase difference of the track when the aperture width becomes the same as the track width. From FIG. 5, the reflectance at the point of reflection was acquired as R3t=4.7%. FIG. 6 is a graph showing the relation between R3 and R3t acquired from the relations regarding the reflectance R1, the track width, and the condensed light spot diameter in the optical information recording medium 20 shown in FIG. 1 and FIG. 2. From that, it was acquired as R3=14.8%.

Figure 7:
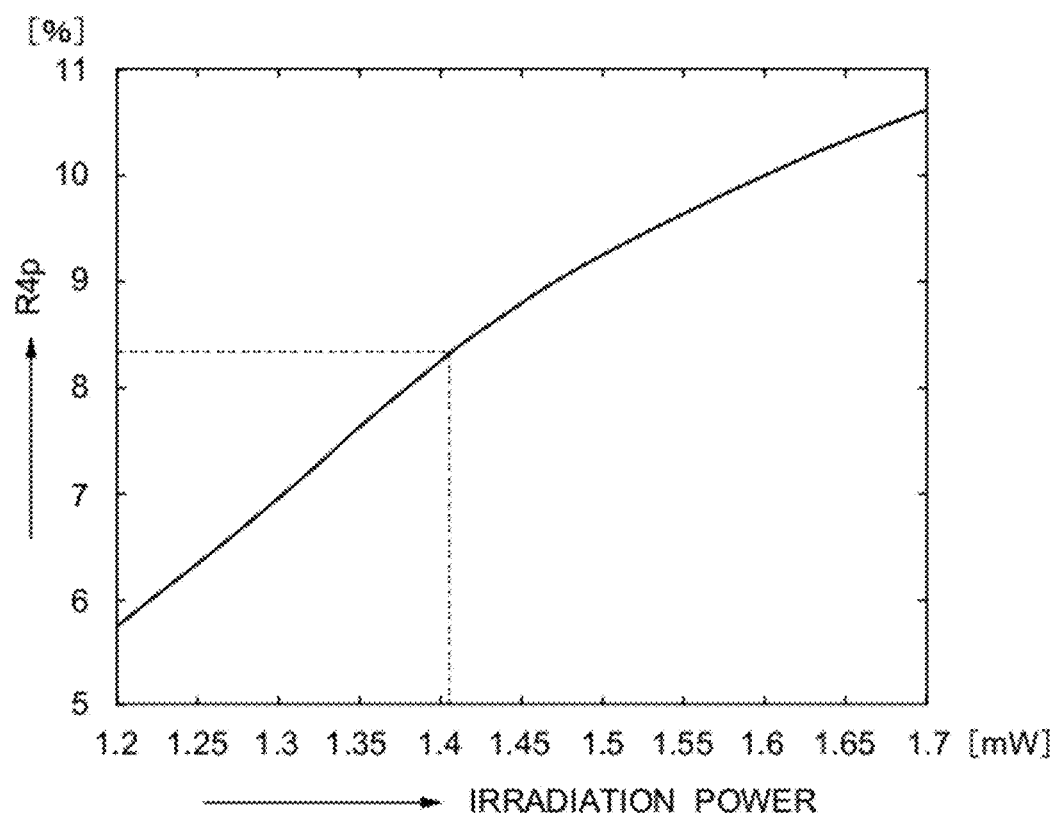
FIG. 7 is a graph acquired by measuring reflectance R4$p$ while changing the irradiation power between 1.2 and 1.7 mW with the optical information recording medium shown in FIG. 1 and FIG. 2.

At last, the reflectance R4 of the recording track within the aperture is acquired. The reflectance R4p=P4/PH was acquired from the reflected light detection power P4 at the time of irradiating a laser beam of a high power PH with which the super-resolution film is fused on the track where the recording mark of the same width as the track width used at the time of acquiring the reflectance R2 was recorded. FIG. 7 is a graph acquired by measuring the reflectance R4$p$ while changing the irradiation power between 1.2 and 1.7 mW with the optical information recording medium 20 shown in FIG. 1 and FIG. 2.

Figure 8:
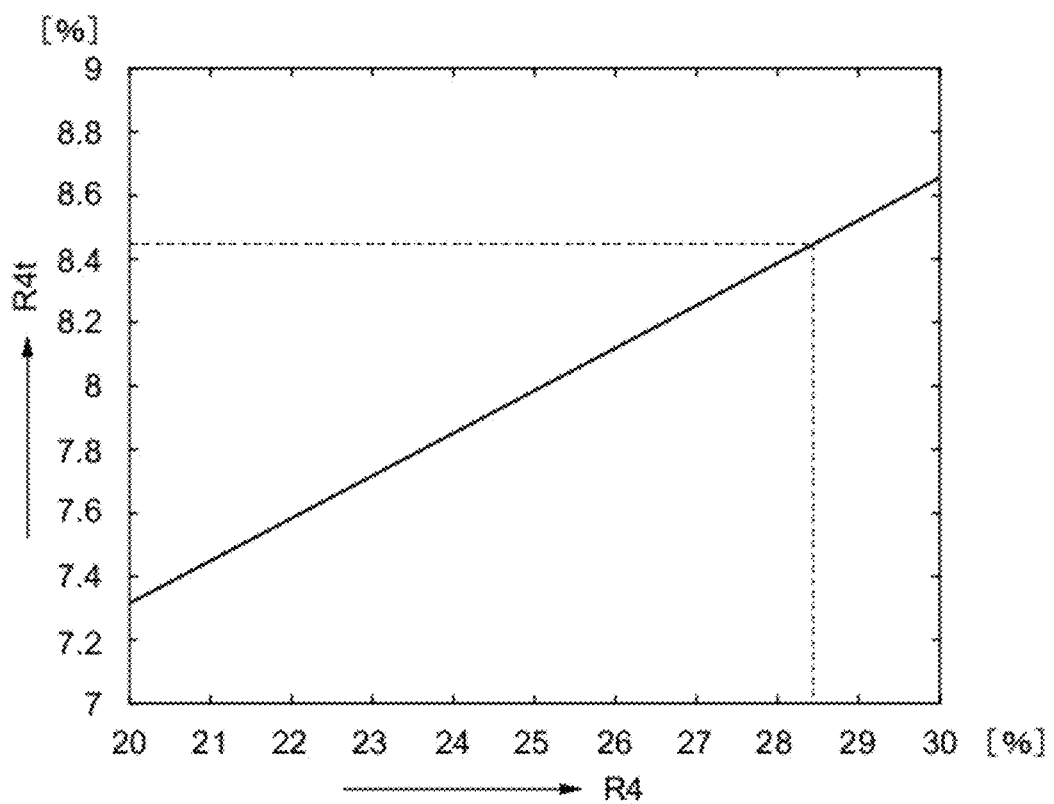
FIG. 8 is a graph showing the relation between R4 and R4$t$ acquired from the relation of reflectance R1 and R2, track width, and condensed light spot diameter with the optical information recording medium shown in FIG. 1 and FIG. 2.

According to FIG. 7, there is a point of reflection generated in the reflectance R4$p$ in the vicinity of the irradiation power of 1.4 mW. This is a point of reflection generated due to a phase difference of the track when the aperture width becomes the same as the track width. From FIG. 7, the reflectance at the point of reflection was acquired as R4$t$=8.5%. FIG. 8 is a graph showing the relation between R4 and R4$t$ acquired from the relations regarding the reflectance R1, R2, the track width, and the condensed light spot diameter in the optical information recording medium 20 shown in FIG. 1 and FIG. 2. From that, it was acquired as R4=28.4%.

Mark sequences of 100 nm at the shortest were recorded on the seventy-six kinds of optical information recording media 20 with a linear speed of 6.6 m/s and a recording power of 12 to 14 mW in the manner described above. The recorded mark sequences were of (1-7) modulation, and the shortest mark was 100 nm while the longest mark was 400 nm. Evaluations were conducted with the linear speed of 6.6 m/s and reproduction powers of 1 mW to 2 mW, and PR (1, 2, 2, 2, 1) equalized waveforms were binarized by Viterbi detection to compare bit error rates (expressed as BER hereinafter) at the time of super-resolution reproduction.

FIG. 9 is a table showing the medium structure (film thickness of each dielectric film), the reflectance R1 to R4, the design indexes f1, f2, and BER of the super-resolution reproduction signals regarding ten typical kinds among the seventy-six kinds of optical information recording media 20. It can be found from FIG. 9 that only the medium simultaneously satisfying the design index f1$\geq$1.8 and f2$\geq$0.16 has BER of 10^-4 or less as the standard of the value to bear the practical use.

FIG. 10 is a graph showing the relation between the design index f1 and BER of the super-resolution reproduction signal of the optical information recording medium 20 shown in FIG. 1 and FIG. 2. Each plot shows the seventy-six kinds of media, respectively. It can be found from FIG. 10 that the medium satisfying the design index f1$\geq$1.8 has BER of 10^-4 or less.

FIG. 11 is a graph showing the relation between the design index f2 and BER of the super-resolution reproduction signal of the optical information recording medium 20 shown in FIG. 1 and FIG. 2. In FIG. 10, the medium satisfying f1$\geq$1.8 is expressed with a circle, and others are expressed with a triangle. Regarding the media (marked with circles) satisfying f1$\geq$1.8 in FIG. 10, it can be found that BER is 10^-4 or less when f2$\geq$0.16. Further, since the design index f2 and BER exhibit a negative correlation, it is possible to acquire an optical information recording medium of still lower BER through satisfying f1$\geq$1.8 and maximizing the design index f2.

In the optical information recording medium 20 according to the present invention, R1 to R4 are specified to satisfy the design index f1$\geq$1.8 and f2$\geq$0.16 simultaneously. Thus, it is possible to acquire stable BER at all times. Therefore, it is possible to acquire a highly reliable optical information recording medium of low BER whose mass-production can be easily done at a low cost.

While the present invention has been described by referring to specific embodiments illustrated in the drawings, the present invention is not limited only to those embodiments described above. Any other structures can be considered to be included in the technical scope of the present invention, as long as the effects equivalent to those of the present invention can be achieved therewith.

This Application claims the Priority right based on Japanese Patent Application No. 2009-066078 filed on Mar. 18, 2009 and the disclosure thereof is hereby incorporated by reference in its entirety.

Industrial Applicability

The present invention can be utilized for all kinds of super-resolution optical information recording media.

REFERENCE NUMERALS

10 Laser beam source
20 Optical information recording medium
21 Transparent substrate (support substrate)
22 First dielectric film
23 Super-resolution film
24 Second dielectric film
25 Recording film
26 Third dielectric film
27 Reflection film
31 Recording mark
32 Condensed light spot
33 Aperture
34 Region other than aperture

The invention claimed is:

1. A super-resolution optical information recording medium comprising a super-resolution layer and a recording layer stacked on a support substrate, with which reproduction of information is executed by using a light beam, wherein:
the super-resolution layer has, as characteristics thereof, a first state which keeps a solid phase state for irradiation of the light beam and a second state with which an optical constant changes by being turned into a liquid layer state for irradiation of a light beam whose light intensity is higher than the light beam of the first state;
reflectance in an unrecorded region of the recording layer under a state where the super-resolution layer is in the first state is defined as R1 and reflectance of a region where data is recorded is defined as R2, whereas reflectance in an unrecorded region of the recording layer under a state where the super-resolution layer is in the second state is defined as R3 and reflectance of a region where data is recorded is defined as R4; and
each reflectance in the recorded region and the unrecorded region of the recording layer is so specified that a ratio of a super-resolution signal intensity acquired in the second state region with respect to a background light interference intensity acquired in the first state region for the light beam is expressed as f1=|(R4−R3)/(R2−R1)| and specified to satisfy f1$\geq$1.8, and that a ratio of a super-resolution signal intensity acquired in the second state region with respect to a disk noise intensity acquired in the regions of each of the first state and the second state is expressed as f2=|(R4−R3)/(R1+R2+R3+R4)| and specified to satisfy f2$\geq$0.16.

2. The optical information recording medium as claimed in claim 1, wherein the support substrate is transparent.

3. The optical information recording medium as claimed in claim 1, wherein the super-resolution layer and the recording layer are formed on the support substrate along with a reflection film via a dielectric film.

4. The optical information recording medium as claimed in claim 1, wherein the light beam is a laser beam.

* * * * *